(12) United States Patent
Jacobs

(10) Patent No.: US 12,308,552 B2
(45) Date of Patent: May 20, 2025

(54) WIRE FAIRLEAD ASSEMBLY

(71) Applicant: SolTec Solutions, LLC, Bethlehem, PA (US)

(72) Inventor: Justin Jacobs, Whitehall, PA (US)

(73) Assignee: Soltec Solutions, LLC, Bethlehem, PA (US)

( * ) Notice: Subject to any disclaimer, the term of this patent is extended or adjusted under 35 U.S.C. 154(b) by 254 days.

(21) Appl. No.: 18/135,133

(22) Filed: Apr. 15, 2023

(65) Prior Publication Data

US 2024/0347958 A1 Oct. 17, 2024

(51) Int. Cl.
*H01R 13/447* (2006.01)
*H01R 13/52* (2006.01)

(52) U.S. Cl.
CPC ....... *H01R 13/447* (2013.01); *H01R 13/5213* (2013.01)

(58) Field of Classification Search
CPC ..... H01R 13/447; H01R 13/5213; H02G 3/32
USPC .......................................................... 174/67
See application file for complete search history.

(56) References Cited

U.S. PATENT DOCUMENTS

| | | | | |
|---|---|---|---|---|
| 4,023,758 A | * | 5/1977 | Yuda | F16L 3/13 248/74.3 |
| 4,881,705 A | * | 11/1989 | Kraus | F16L 3/237 248/68.1 |
| 5,653,411 A | * | 8/1997 | Picco | F16L 3/2235 24/339 |
| 6,809,257 B2 | * | 10/2004 | Shibuya | F16L 3/1083 174/72 A |
| 10,283,950 B2 | * | 5/2019 | Gintz | H02G 3/32 |
| 10,530,135 B1 | * | 1/2020 | Baldwin | H02G 3/045 |
| 2004/0182973 A1 | * | 9/2004 | Kawai | H02G 3/32 248/74.1 |
| 2008/0000671 A1 | * | 1/2008 | Bratt | H02G 3/32 174/135 |
| 2014/0273606 A1 | * | 9/2014 | Peterson | H01R 4/24 439/391 |

* cited by examiner

*Primary Examiner* — Timothy J Thompson
*Assistant Examiner* — Michael F McAllister
(74) *Attorney, Agent, or Firm* — Joseph E. Maenner; Maenner & Associates, LLC

(57) ABSTRACT

A wire fairlead assembly includes a base extending along a longitudinal axis and having a top surface, a channel cut into the top surface and extending along the longitudinal axis, and a locking tab extending upwardly from the base. A cap is releasably connectable to the base. The cap has a receiver configured to engage the locking tab such that, when the cap is located onto top surface in a first position, the cap is not locked to the base, and when the cap is rotated from the first position to a second position along the top surface, the cap is releasably secured to the base.

18 Claims, 7 Drawing Sheets

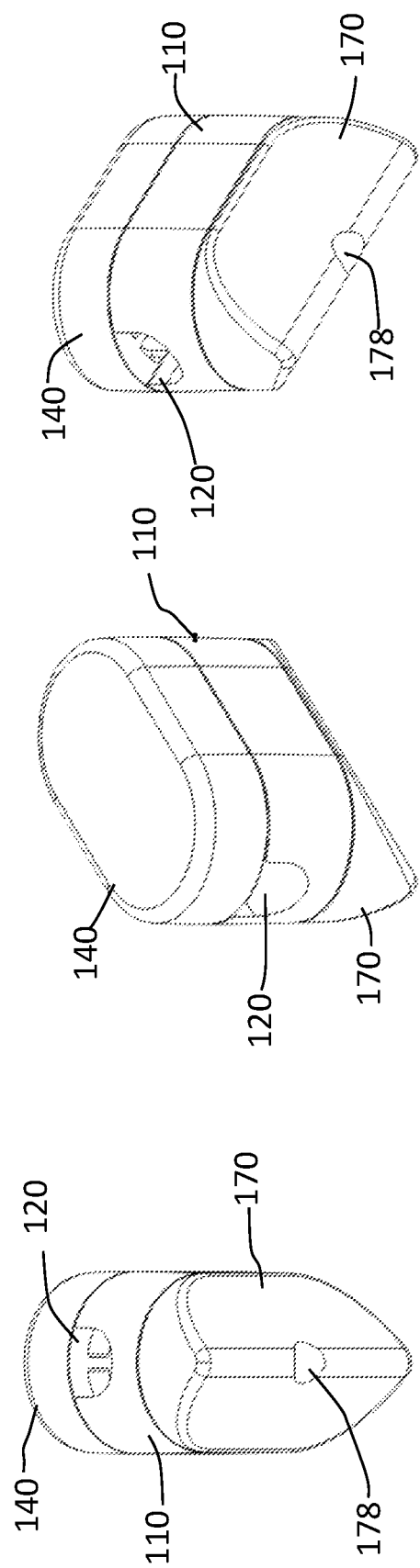

with some effort …

WIRE FAIRLEAD ASSEMBLY

BACKGROUND OF THE INVENTION

Field of the Invention

The invention relates to a device that is used to mount a wire or change direction of a wire run.

Description of the Related Art

A fairlead is a device to guide a line, such as an electrical wire, around an object, out of the way or to prevent the wire from moving laterally along a surface.

It would be beneficial to provide a wire fairlead that secures a wire and can also fit into a corner formed by two adjoining walls.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a wire fairlead assembly having a base extending along a longitudinal axis and having a top surface, a channel cut into the top surface and extending along the longitudinal axis, and a locking tab extending upwardly from the base. A cap is releasably connectable to the base. The cap has a receiver configured to engage the locking tab such that, when the cap is located onto top surface in a first position, the cap is not locked to the base, and when the cap is rotated from the first position to a second position along the top surface, the cap is releasably secured to the base.

In an alternative embodiment, a method provides providing a wire fairlead assembly according to the present invention; placing the base against a wall and inserting a fastening member through the first through hole, securing the base to the wall; placing the wire through the channel; and securing the cap to the base.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 16 is a bottom perspective view of the wedge of FIG. 14 having been attached to the base of the assembly of FIG. 1;

FIG. 17 is a top perspective view of a second exemplary wire fairlead assembly according to the present invention;

FIG. 18 is a bottom perspective view of the fairlead assembly of FIG. 17;

DETAILED DESCRIPTION

Figure 3:
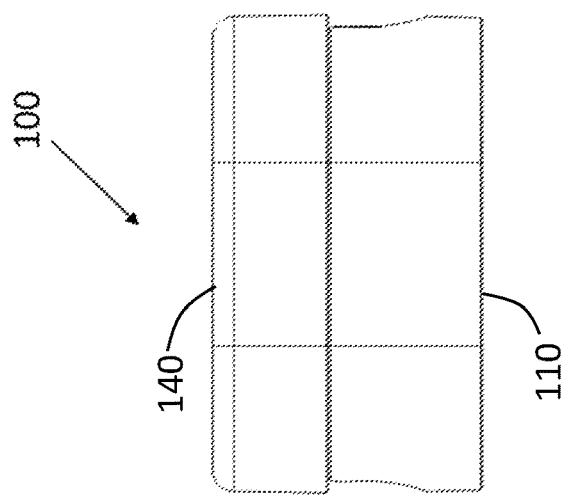
FIG. 3 is a front elevational view of the assembly of FIG. 1, with the rear elevation view being identical.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention provides a wire fairlead assembly that can be used so secure a wire to a wall. With an optional wedge attachment, the fairlead assembly can be attached to a corner comprised of two walls that meet at a right angle to each other, such as in the corner of a room.

Referring to FIGS. 1-13, a wire fairlead assembly 100 ("assembly 100") includes a base 110 and a cap 140 that is releasably attachable to base 110. Assembly 100 can be constructed from individual pieces that are injection molded plastic or other suitable material.

Base 110 extends along a longitudinal axis 112 and has a top surface 114, a bottom surface 116, and a generally oblong shaped outer perimeter 118, giving the base 110 an oblong shape.

Figure 2:
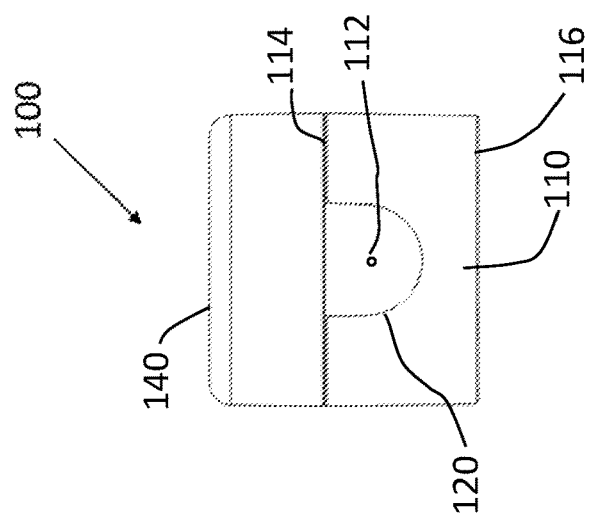
FIG. 2 is a left side elevational view of the assembly of FIG. 1, with the right side elevational view being identical.
Figure 1:
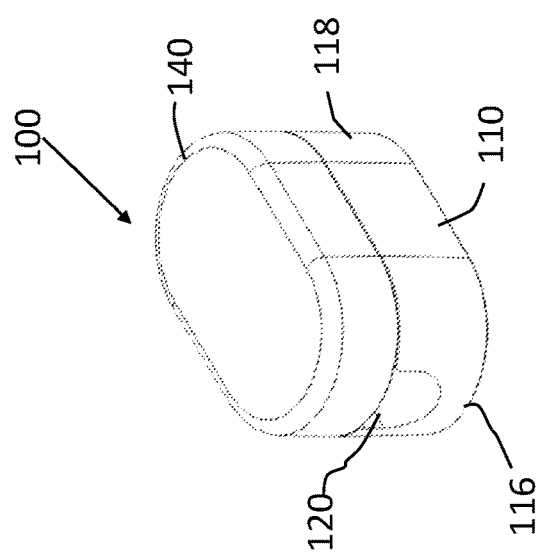
FIG. 1 is a perspective view of a first exemplary wire fairlead assembly according to the present invention.
Figure 6:
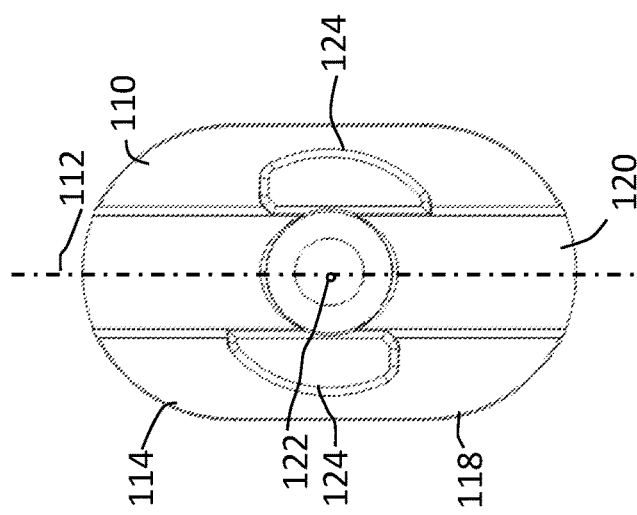
FIG. 6 is a top plan view of a base of the assembly of FIG. 1, with the cap removed.

Referring to FIGS. 2 and 6, a channel 120 is cut into the top surface 114 and extends along the longitudinal axis 112. Referring to FIG. 2, channel 120 has a generally U-shaped cross-section and is sized to allow wire 50 (shown in FIG. 13) to fit through with cap 140 attached to base 110. The channel 120 has a first through hole 122 extending therethrough that is sized to allow a screw (not shown) to be inserted therethrough so that base 110 can be secured to a wall (not shown) with the screw.

Figure 7:
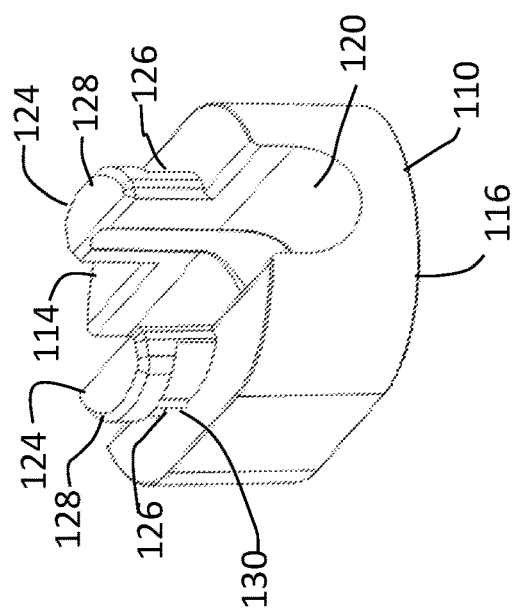
FIG. 7 is a perspective view of the base of FIG. 6.
Figure 12:
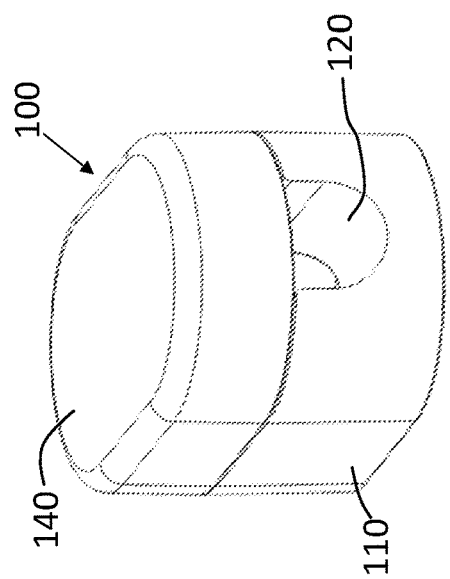
FIG. 12 is a top perspective view of the cap locked onto the base to form the assembly of FIG. 1.

Referring to FIG. 7, a pair of locking tabs 124 extends upwardly from the base 110 on either side of channel 120. Each locking tab 124 comprises a pair of risers 126 extending upwardly from the top surface 114, and a locking tab 128 extending from each of the risers 126 away from the channel 120. Each locking tab 128 comprises an arcuate, generally involute profile and each of the risers 126 comprises a locking bump 130 extending outwardly therefrom. The involute profile assists in wedging locking tabs 128 against a receiver 142 inside cap 140 when cap 140 is rotated to lock onto base 110.

Similar to base 110, cap 140 has an oblong shape such that, when cap 140 is locked onto base 110, the entire assembly 100 has an overall oblong shape. Cap 140 is releasably connectable to the base 110. Cap 140 has a receiver 142 configured to engage the locking tab 128 such that, when the cap 140 is located onto top surface 114 in a first position, the cap 140 is not locked to the base 110, and when the cap 140 is rotated from the first position to a second position along the top surface 114, such as, for example, about 90 degrees as shown between FIG. 10 and FIG. 11, the cap 140 is releasably secured to the base 110.

Figure 8:
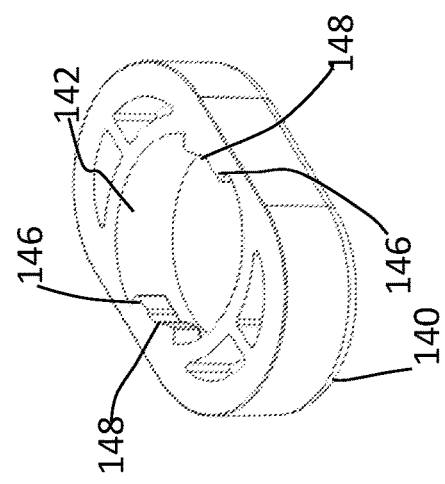
FIG. 8 is a perspective view of the cap of the assembly of FIG. 1.

Referring to FIG. 8, cap 140 comprises receiver 142 having a generally circular perimeter formed therein and a pair of diametrically opposing cap tabs 146 that each extends into the receiver 142 and is configured to engage the locking tab 128. Each cap tab 146 has a recess 148 that is configured to accept and retain the locking bump 130 when cap 140 is rotated into the locking position.

Figure 5:
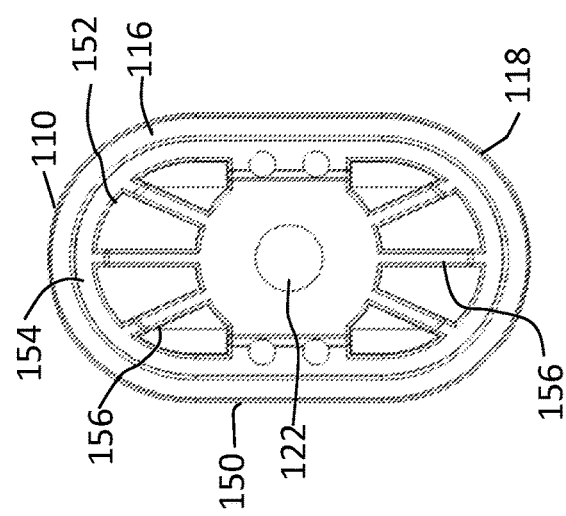
FIG. 5 is a bottom plan view of the assembly of FIG. 1.
Figure 4:
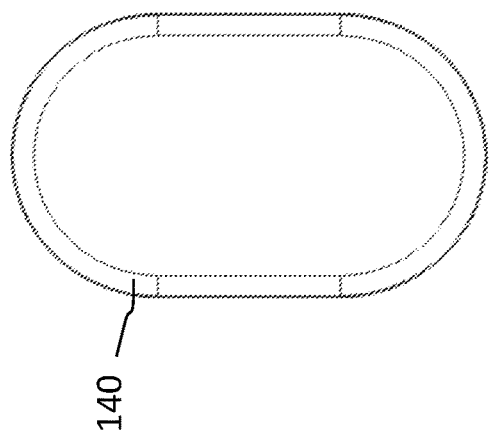
FIG. 4 is a top plan view of the assembly of FIG. 1.
Figure 9:
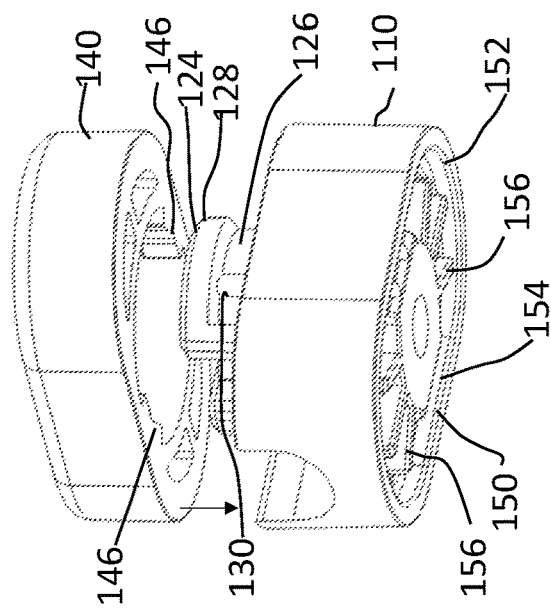
FIG. 9 is a bottom perspective view of the cap being fitted onto the base to form the assembly of FIG. 1.

Referring to FIG. 5, base 110 further comprises a bottom surface 150 and a groove 152 formed around an inner perimeter 154 of the bottom surface 150. Ribs 156 are formed on bottom surface 150 to enhance the structural integrity of base 140.

Figure 15:
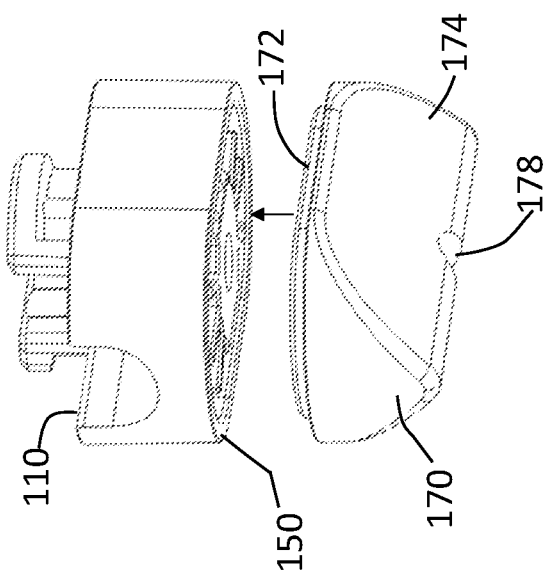
FIG. 15 is a perspective view of the wedge of FIG. 14 being attached to the base of the assembly of FIG. 1.
Figure 14:
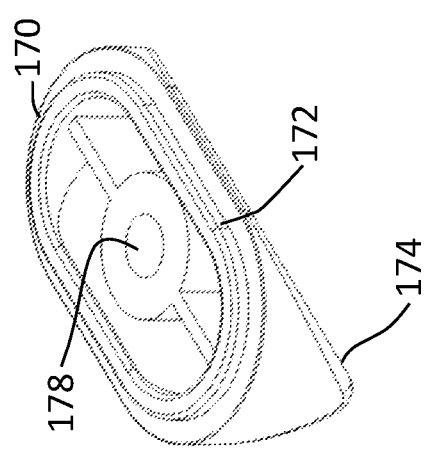
FIG. 14 is a perspective view of a wedge for attaching to the base of the assembly of FIG. 1.
Figure 13:
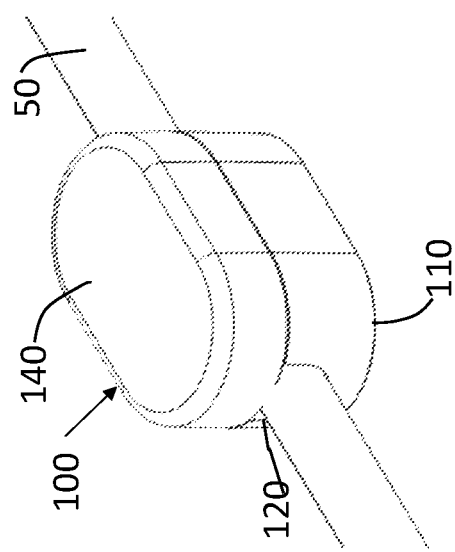
FIG. 13 is a perspective view of the assembly of FIG. 1 with a wire run through the assembly.
Figure 21:
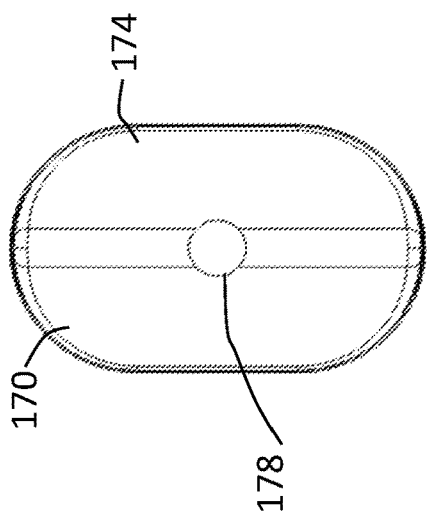
FIG. 21 is a bottom plan view of the assembly of FIG. 17.
Figure 20:
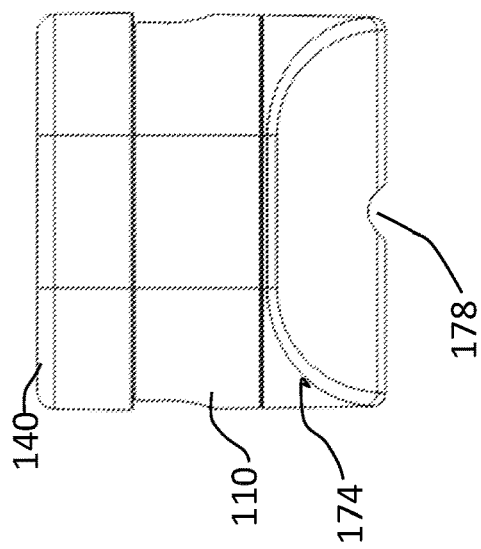
FIG. 20 is a front elevational view of the assembly of FIG. 17, with the rear elevation view being identical.
Figure 19:
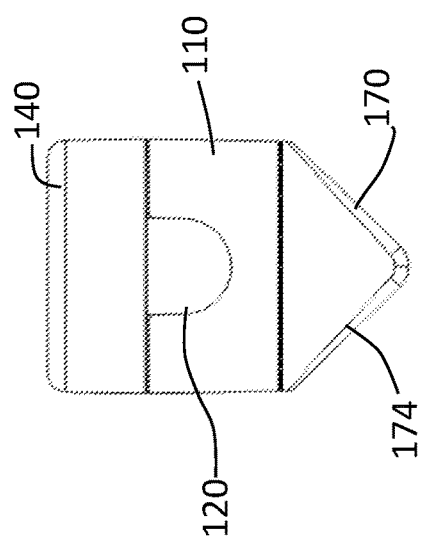
FIG. 19 is a left side elevational view of the assembly of FIG. 17, with the right side elevational view being identical.

If assembly 100 is to be placed in a corner of a room, such as where two walls meet at a 90 degree angle, a wedge attachment 170, shown in FIG. 14, is provided. Wedge attachment 170 is configured to be releasably attached to the bottom surface 150 of the base 110, as shown in FIG. 15. Wedge attachment 170 includes a flange 172 that is configured to fit inside the groove 152 to align base 140 onto wedge assembly 170.

To allow assembly 100 to fit into a corner of a room formed by two intersecting walls, wedge attachment 170 comprises an angled lower portion 174 that has a 90 degree angle. As shown in FIGS. 15, 16, 8, and 20, wedge attachment 170 includes a second through hole 178 extending there through such that, when the wedge attachment 170 is releasably attached to the base 110, the second through hole 178 aligns axially with the first through hole 122 in base 110 so that a screw (not shown) can be inserted through first and second through holes 122, 178 and into the corner of the intersecting walls to secure assembly 100 in place.

To attach a wire to assembly 100, base 110 is placed against a wall (not shown) and a fastening member, such as a screw (not shown), is inserted through the first through hole 122, securing the base 110 to the wall. Wire 50 is placed in channel 120 and cap 140 is secured to the base 110 by placing the cap 140 onto the base 110 and rotating the cap 140 relative to the base 110. This last step comprises seating the locking bump 130 into the recess 148.

Figure 11:
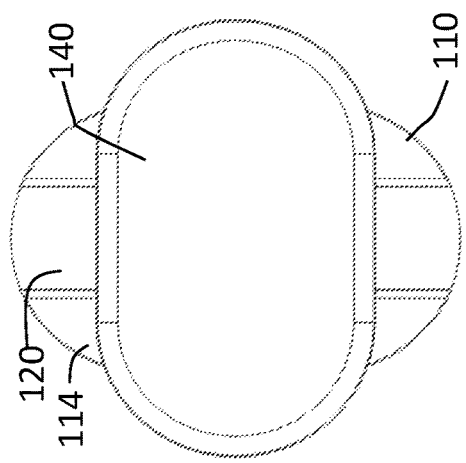
FIG. 11 is a top perspective view of the cap fitted onto the base of the assembly of FIG. 1.
Figure 10:
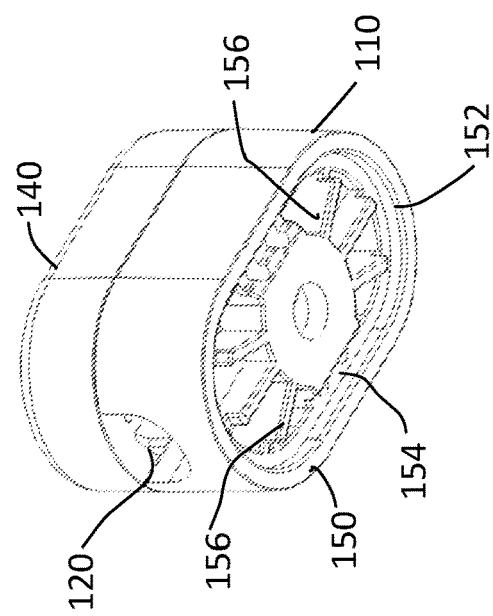
FIG. 10 is a bottom perspective view of the assembly of FIG. 1.

To remove the wire 50 from assembly 100, cap 140 is rotated relative to base 110 from the position shown in FIG. 11 to the position shown in FIG. 10. Cap 140 is then lifted away from base 110 to access wire 50. Wire 50 can then be removed from base 110.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A wire fairlead assembly comprising:
   a base extending along a longitudinal axis and having:
      a top surface;
      a channel cut into the top surface and extending along the longitudinal axis; and
      a first locking tab extending upwardly from the base, wherein the locking tab comprises a pair of risers extending upwardly from the top surface, and a second locking tab extending from each of the risers away from the channel; and a cap releasably connectable to the base such that, when the cap is in a first position, the cap is not locked to the base, and when the cap is moved to a second position, the cap is releasably secured to the base.

2. The wire fairlead assembly according to claim 1, wherein the base comprises an oblong shape.

3. The wire fairlead assembly according to claim 2, wherein the cap comprises an oblong shape.

4. The wire fairlead assembly according to claim 1, wherein the channel has a first through hole extending therethrough.

5. The wire fairlead assembly according to claim 1, wherein each of the first and second locking tabs comprises an arcuate, non-circular profile.

6. The wire fairlead assembly according to claim 5, wherein each of the risers comprises a locking bump extending outwardly therefrom.

7. The wire fairlead assembly according to claim 6, wherein the cap comprises a cavity and a cap tab extending into the cavity and configured to engage the locking tab, the cap tab having a recess configured to accept and retain the locking bump.

8. The wire fairlead assembly according to claim 7, wherein the cavity comprises a circular perimeter.

9. A wire fairlead assembly comprising:
   a base extending along a longitudinal axis and having:
      a top surface;
      a channel cut into the top surface and extending along the longitudinal axis; and
      a bottom surface and a groove formed around an inner perimeter of the bottom surface;
   a cap releasably connectable to the base such that, when the cap is in a first position, the cap is not locked to the base, and when the cap is moved to a second position, the cap is releasably secured to the base; and
   a wedge attachment configured to be releasably attached to the bottom surface of the base.

10. The wire fairlead assembly according to claim 9, wherein the wedge comprises a flange configured to fit inside the groove.

11. The wire fairlead assembly according to claim 9, wherein the wedge attachment comprises an angled lower portion.

12. The wire fairlead assembly according to claim 11, wherein the angled lower portion comprises a 90 degree angle.

13. The wire fairlead assembly according to claim 11, wherein the angled lower portion is configured to fit against a corner formed by two intersecting walls.

14. The wire fairlead assembly according to claim 9, wherein the wedge attachment comprises a second through hole extending there through such that, when the wedge attachment is releasably attached to the base, the second through hole aligns axially with the first through hole.

15. The wire fairlead assembly according to claim 1, wherein the cap is moved between the first position and the second position by rotating the cap relative to the base.

16. A method of attaching a wire to a fairlead assembly comprising the steps of:
   (a) providing a wire fairlead assembly comprising:
      a base extending along a longitudinal axis and having:
         a top surface;
         a channel cut into the top surface and extending along the longitudinal axis; and
         a first locking tab extending upwardly from the base, wherein the locking tab comprises a pair of risers extending upwardly from the top surface, and a second locking tab extending from each of the risers away from the channel; and
      a cap releasably connectable to the base such that, when the cap is in a first position, the cap is not locked to the base, and when the cap is moved to the second position, the cap is releasably secured to the base;
      wherein each of the first and second locking tabs comprises an arcuate, non-circular profile, wherein each of the risers comprises a locking bump extending outwardly therefrom, and wherein the cap comprise a cavity and a cap tab extending into the cavity and configured to engage the locking tab, the cap tab having a recess configured to accept and retain the locking bump;
   (b) placing the base against a wall and inserting a fastening member through the first through hole, securing the base to the wall;
   (c) placing the wire through the channel; and
   (d) securing the cap to the base.

17. The method according to claim 16, wherein step (d) comprises:
   (d)(1) placing the cap onto the base; and
   (d)(2) rotating the cap relative to the base.

18. The method according to claim 16, wherein step (d)(2) comprises seating the locking bump into the recess.

* * * * *